US012792556B2

(12) United States Patent
Ichikawa et al.

(10) Patent No.: US 12,792,556 B2
(45) Date of Patent: Nov. 10, 2026

(54) INTERMEDIATE APPARATUS, COMMUNICATION METHOD, AND PROGRAM

(71) Applicant: NTT, Inc., Tokyo (JP)

(72) Inventors: Junki Ichikawa, Tokyo (JP); Hideki Nishizawa, Tokyo (JP); Kenji Shimizu, Tokyo (JP); Yukio Tsukishima, Tokyo (JP); Tomoya Hibi, Tokyo (JP); Kiwami Inoue, Tokyo (JP)

(73) Assignee: NTT, Inc., Tokyo (JP)

( * ) Notice: Subject to any disclaimer, the term of this patent is extended or adjusted under 35 U.S.C. 154(b) by 29 days.

(21) Appl. No.: 18/693,464

(22) PCT Filed: Sep. 27, 2021

(86) PCT No.: PCT/JP2021/035305
§ 371 (c)(1),
(2) Date: Mar. 19, 2024

(87) PCT Pub. No.: WO2023/047567
PCT Pub. Date: Mar. 30, 2023

(65) Prior Publication Data
US 2024/0394215 A1 Nov. 28, 2024

(51) Int. Cl.
*G06F 3/06* (2006.01)
*G06F 15/173* (2006.01)

(52) U.S. Cl.
CPC ........ *G06F 15/17331* (2013.01); *G06F 3/061* (2013.01); *G06F 15/17356* (2013.01)

(58) Field of Classification Search
CPC ................ H04L 12/4633; H04L 12/56; H04L 2012/5619; G06F 13/1668; G06F 13/4282;
(Continued)

(56) References Cited

U.S. PATENT DOCUMENTS 10,572,180 B1 * 2/2020 Nemawarkar ........ G06F 3/0659
2007/0206598 A1 9/2007 Yamada
(Continued)

FOREIGN PATENT DOCUMENTS

JP 2007235674 9/2007
JP 201061194 3/2010

OTHER PUBLICATIONS

[No Author Listed], "InfiniBandTM Architecture Specification vol. 1," InfiniBand Trade Association, Apr. 2020, 1981 pages.
(Continued)

*Primary Examiner* — Ernest Unelus
(74) *Attorney, Agent, or Firm* — Fish & Richardson P.C.

(57) ABSTRACT

An intermediate device 10A is the intermediate device 10A disposed between a requester 30 for transferring data using RDMA and a responder 50. The intermediate device 10A extracts a combination of a QPN of the requester 30 and the QPN of the responder 50 from a packet transmitted and received when establishing the connection, and registers the combination in a QPN table 15. The intermediate device 10A manages an MSN by a WQ table 17, and transitions the MSN number when receiving a request with a flag of Last or Only from the requester 30, and returns a pseudo-Response including the MSN after the transition.

4 Claims, 11 Drawing Sheets

(58) Field of Classification Search
CPC ......... G06F 15/17331; G06F 15/17356; G06F 3/061; G06F 3/065; G06F 3/067; G06F 3/0683
See application file for complete search history.

(56) References Cited

U.S. PATENT DOCUMENTS

| | | | | |
|---|---|---|---|---|
| 2010/0064070 | A1 | 3/2010 | Yoshimura et al. | |
| 2016/0259559 | A1 * | 9/2016 | Jin | G06F 3/0619 |
| 2019/0013965 | A1 * | 1/2019 | Sindhu | H04L 49/10 |

OTHER PUBLICATIONS

Kuga et al., "PCIe device emulation method by software that can cooperate with physical machine," IPSJ SIG Technical Report, Jul. 2019, 6 pages (submitted with ISR).

* cited by examiner

Fig. 3

| key (Com ID) | Local QPN | Remote QPN |
|---|---|---|
| 0x12345678 | 0x123456 | 0x987654 |
| 0x98765432 | 0x987654 | 0x123456 |
| ... | ... | ... |

Fig. 7

| key (dst QPN) | src QPN | MSN |
|---|---|---|
| 0x987654 | 0x123456 | 0 |
| ... | ... | ... |

INTERMEDIATE APPARATUS, COMMUNICATION METHOD, AND PROGRAM

CROSS-REFERENCE TO RELATED APPLICATIONS

This application is a National Stage application under 35 U.S.C. § 371 of International Application No. PCT/JP2021/035305, having an International Filing Date of Sep. 27, 2021. The disclosure of the prior application is considered part of the disclosure of this application, and is incorporated by reference in its entirety into this application.

TECHNICAL FIELD

The present invention relates to an intermediate apparatus, a communication method, and a program.

BACKGROUND ART

Remote direct memory access (RDMA) is a communication protocol for performing high-speed and high-reliability data transfer between communication terminals located at a distance. Since the RDMA directly performs memory access from the memory area of the transmission terminal to the memory area of the reception terminal, high-speed communication is possible. The RDMA has a credit-based flow control function, and performs retransmission control based on timer-out and packet loss detection, so that highly reliable communication can be performed. The RDMA is also used as a transport system for data communication of a host-to-device, and device-to-device between a solid state drive (SSD) and a graphics processing unit (GPU).

CITATION LIST

Non Patent Literature

[NPL 1] InfiniBand Architecture Specification Volume 1, Release 1.4, Apr. 7, 2020

SUMMARY OF INVENTION

Technical Problem

A communication model of RDMA will be described with reference to FIG. 1. The RDMA is a communication model for transferring data using a Queue Pair (QP) composed of a Send Queue (SQ) and a Receive Queue (RQ). The communication unit of the RDMA is a communication request called a work request (WR), and is stored in SQ/RQ in a unit of a Work Queue Element (WQE). The WQE can be stacked on the SQ/RQ by first-in-first-out (FIFO) according to the queue size of the SQ/RQ. After successful WQE processing between QPs, the WQE of the SQ/RQ is deleted, and the acceptance of the next WR becomes possible.

In the prior art, when the network distance becomes long, the transfer performance of the RDMA deteriorates. In the RDMA, if the WQE of the requester is completed and no vacancy is created in the SQ, the process cannot proceed to the next WR. In the connection type service type, it is necessary to receive an ACK from the responder in order to complete the WQE of the requester. If the WQE which has not yet been completed remains until the ACK is received, the WQE cannot be newly loaded in the queue and the transfer performance deteriorates.

The present invention has been made in view of the above, and an object of the present invention is to realize high-bandwidth data transfer even on a network service having a large round trip time (RTT).

Solution to Problem

An intermediate device according to an aspect of the present invention is an intermediate device disposed between a first device and a second device for transferring data using remote direct memory access, the device including a transfer unit that transfers a packet between the first device and the second device, and a registration unit that extracts a combination of destination information of the first device and destination information of the second device from a packet transmitted and received when establishing a connection between the first device and the second device, and registers the combination in a destination table.

An intermediate device according to an aspect of the present invention includes a management unit that manages a message sequence number indicating a completion state of a request in the second device in a management table, in which the management unit registers destination information of the first device and an initialized message sequence number in the management table with the destination information of the second device as a key at the time of establishing a connection and transitions a message sequence number when a predetermined request is received from the first device, and a generation unit that acquires destination information of the first device and a message sequence number after transition from the management table, generates a pseudo-Response to the request, and returns the pseudo-Response to the first device.

A communication method according to an aspect of the present invention is a communication method of an intermediate device disposed between a first device and a second device that transfer data using remote direct memory access, the method including causing the intermediate device to transfer a packet between the first device and the second device, and extract a combination of destination information of the first device and destination information of the second device from a packet transmitted and received when establishing a connection between the first device and the second device, and register the combination in a destination table.

The communication method according to an aspect of the present invention includes causing the intermediate device to manage a message sequence number indicating a completion state of the request in the second device in a management table, register destination information of the first device and an initialized message sequence number in the management table with the destination information of the second device as a key at the time of establishing a connection and transition a message sequence number when a predetermined request is received from the first device, and acquire destination information of the first device and a message sequence number after transition from the management table, generate a pseudo-Response to the request, and return the pseudo-Response to the first device.

Advantageous Effects of Invention

According to the present invention, high-bandwidth data transfer can be realized even on a network service having a large round trip time (RTT).

BRIEF DESCRIPTION OF DRAWINGS

FIG. 3 is a diagram illustrating an example of a Queue Pair Number table.

FIG. 7 is a diagram illustrating an example of a Work Queue table.

DESCRIPTION OF EMBODIMENTS

An embodiment of the present invention will be described below with reference to the drawings.

[Queue Pair Number (QPN) Management]

Figure 1:
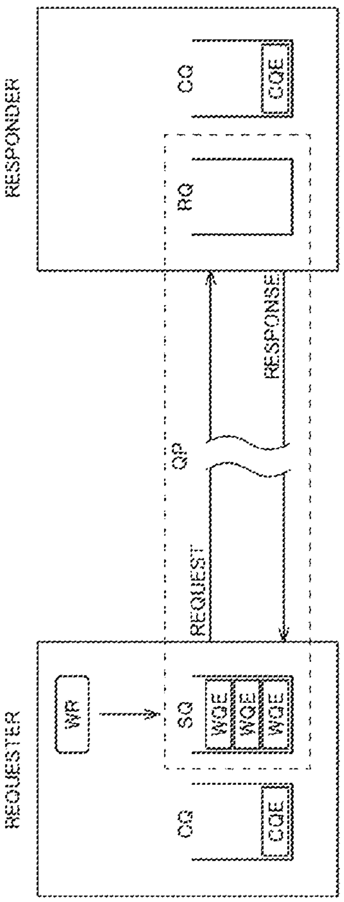
FIG. 1 is a diagram for illustrating a communication model of RDMA.
Figure 2:
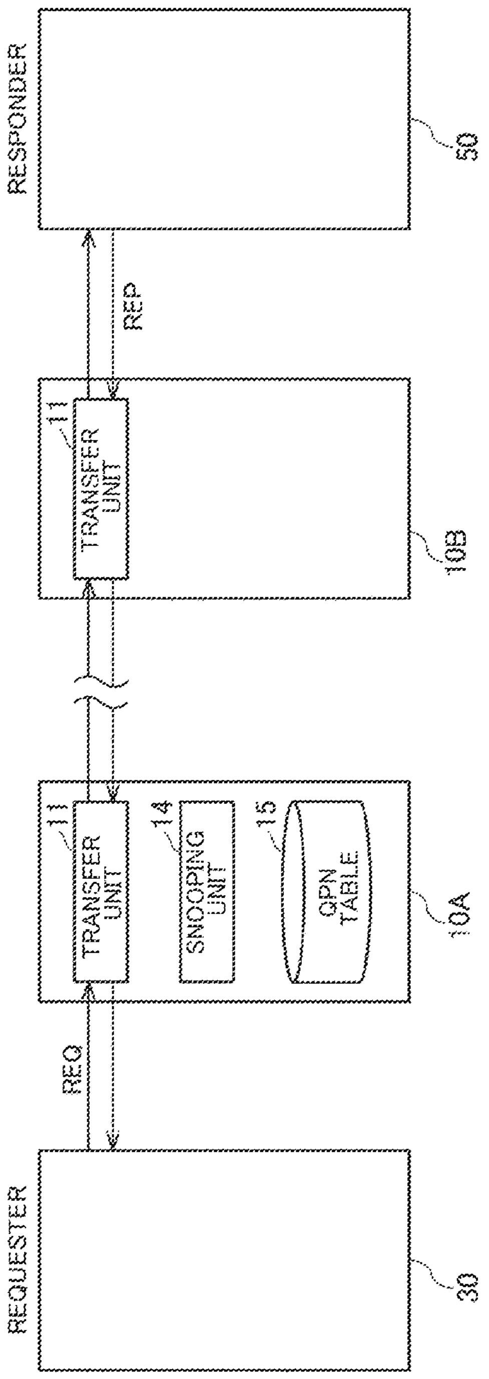
FIG. 2 is a diagram illustrating an example of a configuration of the communication system including an intermediate device of the present embodiment.

Referring to FIG. 2, an example of a communication system including an intermediate device 10A for managing a pair of QPN of a requester 30 and a QPN of a responder 50 will be described. The QPN is a number assigned to each of the end points of the QP. The SQ/RQ recognizes the opposite QPN, and includes the destination QPN in the header when generating an RDMA packet such as a request and a response.

FIG. 2 is a diagram illustrating an example of a configuration of a communication system including intermediate devices 10A and 10B according to the present embodiment. The intermediate devices 10A and 10B are disposed between the requester 30 for transferring data using RDMA and the responder 50. More specifically, the intermediate device 10A is disposed in the pre-stage of the long distance network on the requester 30 side, and the intermediate device 10B is disposed in the pre-stage of the long distance network on the responder 50 side. The requester 30 may be called local and the responder 50 may be called remote.

The intermediate device 10A includes a transfer unit 11, a snooping unit 14, and a Queue Pair Number (QPN) table 15.

The transfer unit 11 transfers a request from the requester 30 to the responder 50, and transfers a response from the responder 50 to the requester 30. Requests and responses transmitted and received between the requester 30 and the responder 50 include REQ, REP and RTU at the time of connection establishment, requests and responses at the time of data transfer, and DREQ and DREP at the time of connection releasing.

The snooping unit 14 intercepts a packet of RDMA Communication Management (RDMA-CM) transmitted and received between the requester 30 and the responder 50 in a connection establishment phase of RDMA-CM, and registers a bidirectional QPN entry having a pair of QPN of the requester 30 and QPN of the responder 50 in the QPN table 15.

The requester 30 and the responder 50 set a communication ID (CID) as an identifier for uniquely identifying communication in the connection. The CID does not change until the connection is discarded. The QPN of each of the requester 30 and the responder 50 is also uniquely identified in association with the CID of each of the requester 30 and the responder 50. The CID and the QPN are exchanged between the requester 30 and the responder 50 in a connection establishment phase, and a CID pair and a QPN pair are set.

The connection establishment phase is configured by 3-way handshake of ConnectRequest (REQ), ConnectReply (REP), and ReadyToUSE (RTU).

The snooping unit 14 intercepts a packet of the RDMA-CM transmitted and received between the requester 30 and the responder 50 in a connection release phase of the RDMA-CM, and deletes a corresponding QPN entry from the QPN table 15.

A pair of CID and QPN set in a connection establishment phase is released in a connection release phase of the RDMA-CM. The connection release phase is composed of handshake of DisconnectRequest (DREQ) and DisconnectReply (DREP).

The QPN table 15 manages a pair of a local side (requester side) QPN and a remote side (responder side) QPN in association with each other using the CID as a key. FIG. 3 illustrates an example of the QPN table 15. When a connection is established between the requester 30 and the responder 50, a QPN entry using a Local CID for uniquely identifying the connection as a key from the viewpoint of the requester 30 and a QPN entry using a Local CID for uniquely identifying the connection as a key from the viewpoint of the responder 50 are created in the QPN table 15. Specifically, in the QPN entry using a Local CID as a key from the viewpoint of the requester 30, a QPN assigned to a QP on the requester 30 side is registered in a Local QPN, and a QPN assigned to a QP on the responder 50 side is registered in a Remote QPN. In the QPN entry using a Local CID as a key from the viewpoint of the responder 50, a QPN assigned to the responder 50 side of QP is registered in the Local QPN, and a QPN assigned to the requester 30 side of QP is registered in the Remote QPN.

The intermediate device 10B includes the transfer unit 11.

Similar to the transfer unit 11 of the intermediate device 10A, the transfer unit 11 transfers the request from the requester 30 to the responder 50 and transfers the response from the responder 50 to the requester 30.

Figure 4:
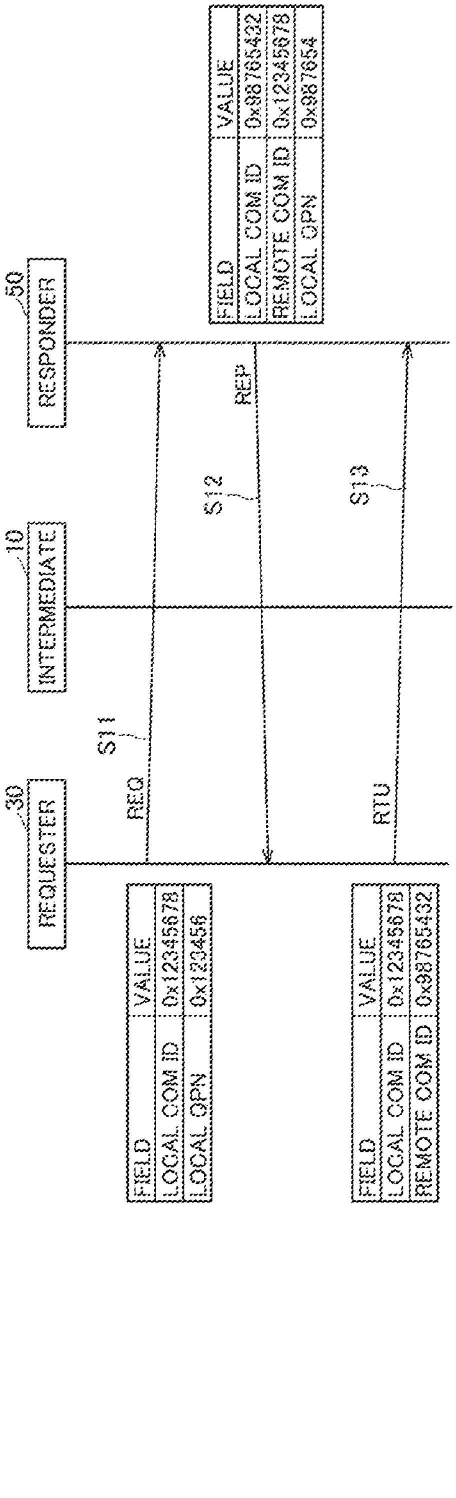
FIG. 4 is a sequence diagram illustrating an example of a flow of processing when establishing a connection.

Next, an example of a flow of processing at the time of establishing the connection will be described with reference to the sequence diagram of FIG. 4. In FIG. 4, the intermediate devices 10A and 10B are illustrated as the intermediate device 10.

In Step S11, the requester 30 transmits the REQ to the responder 50. The REQ includes the Local CID and the Local QPN. The Local CID included in the REQ is an identifier for the requester 30 to identify the connection. The Local QPN included in the REQ is the QPN assigned to the QP of the requester 30.

When transferring the REQ to the responder 50, the intermediate device 10 creates a QPN entry using the Local CID included in the REQ as a key in the QPN table 15, and registers the Local QPN included in the REQ (QPN of the requester 30) in the Local QPN of the QPN entry.

When receiving the REQ, the responder 50 transmits the REP to the requester 30 in Step S12. The REP includes the Local CID, the Remote CID, and the Local QPN. The Local CID included in the REP is an identifier for the responder 50 to identify the connection. The Remote CID included in the REP is an identifier for the requester 30 to identify the connection, and is the same as the Local CID included in the REQ. The Local QPN included in the REP is the QPN assigned to the responder 50.

When transferring the REP to the requester 30, the intermediate device 10 retrieves the QPN entry using the Remote CID included in the REP as a key from the QPN table 15, and registers a Local QPN (QPN of the responder 50) included in the REP in the Remote QPN of the QPN entry. Further, the intermediate device 10 creates the QPN entry in the reverse direction using the Local CID included in the REP as a key in the QPN table 15. Specifically, the intermediate device 10 uses the Local CID included in the REP as a key, registers the QPN of the responder 50 in the Local QPN, and creates the QPN entry in which the QPN of the requester 30 is registered in the Remote QPN in the QPN table 15.

When the requester 30 receives the REP, the requester 30 transmits the RTU to the responder 50 in Step S13. The RTU includes the Local CID and the Remote CID.

By the above processing, a connection between the requester 30 and the responder 50 is established, and a bidirectional QPN entry in which the QPN of the requester 30 and the QPN of the responder 50 are paired is created in the QPN table 15. After the connection is established, data transfer is performed between the requester 30 and the responder 50. The intermediate device 10 transfers a packet between the requester 30 and the responder 50, and generates and transmits a pseudo-Response.

Figure 5:
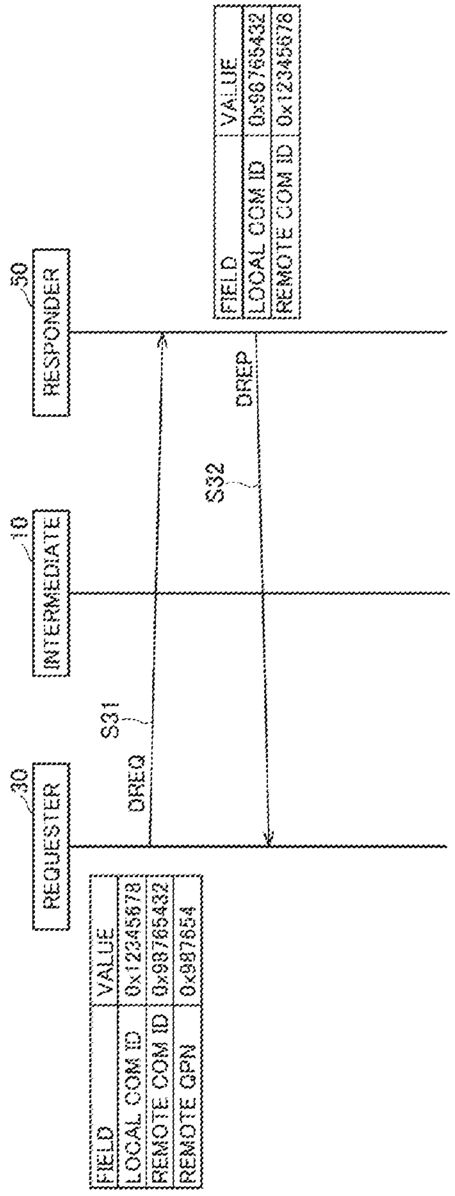
FIG. 5 is a sequence diagram illustrating an example of a flow of processing at the time of connection releasing.

Next, an example of a flow of processing at the time of connection releasing will be described with reference to the sequence diagram of FIG. 5. In FIG. 5, the intermediate devices 10A and 10B are illustrated as the intermediate device 10.

In Step S31, the requester 30 transmits the DREQ to the responder 50. The DREQ includes the Local CID, the Remote CID, and the Remote QPN. The Local CID included in the DREQ is an identifier for the requester 30 to identify the connection. The Remote CID included in the DREQ is an identifier for the responder 50 to identify the connection. The Remote QPN included in the DREQ is the QPN assigned to the responder 50.

The intermediate device 10 transfers the DREQ to the responder 50.

When receiving the DREQ, the responder 50 transmits the DREP to the requester 30 in Step S32. The DREP includes the Local CID and the Remote CID. The Local CID included in the DREP is an identifier for the responder 50 to identify the connection. The Remote CID included in the DREP is an identifier for the requester 30 to identify the connection.

When transferring the DREP to the responder 50, the intermediate device 10 retrieves a QPN entry with the Local CID included in the DREP as a key, deletes the QPN entry from the QPN table 15, retrieves a QPN entry with the Remote CID included in the DREP as a key, and deletes the QPN entry from the QPN table 15.

By the above processing, the connection between the requester 30 and the responder 50 is released, and the QPN entry corresponding to the connection is deleted from the QPN table 15.

[Management of Message Sequence Number (MSN)]

Figure 6:
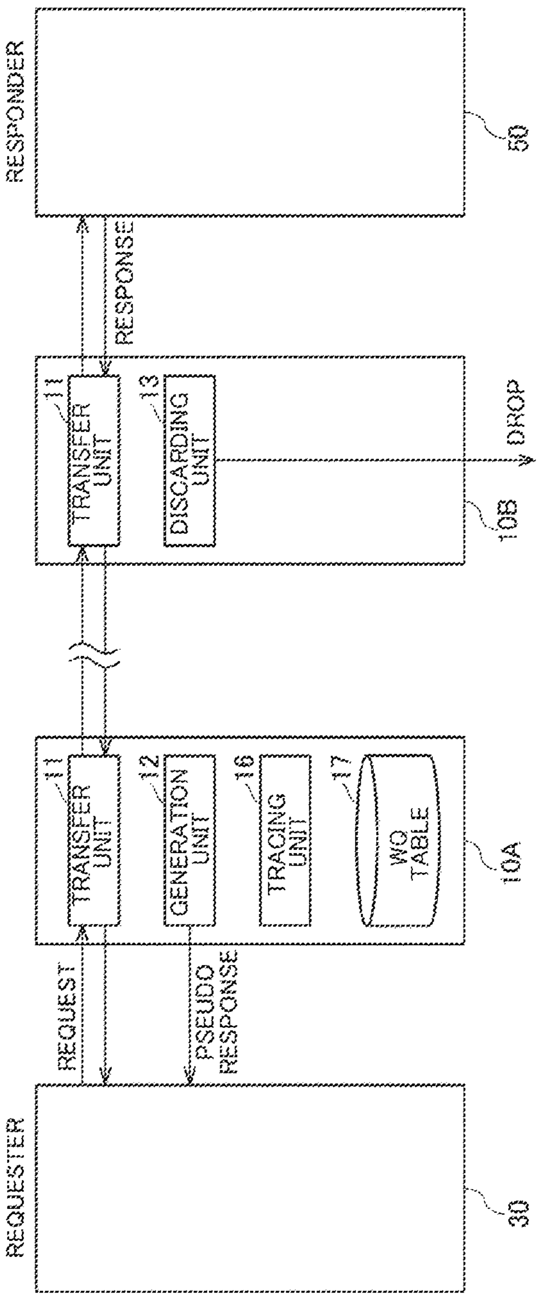
FIG. 6 is a diagram illustrating an example of a configuration of the communication system including the intermediate device according to the present embodiment.

Referring to FIG. 6, an example of a communication system including the intermediate device 10A for managing MSN will be described. The MSN is a numerical value for notifying how much a request from the requester 30 has been completed by the responder 50 in the communication of the service type of the Relatable Connections (RC). The MSN is described in an ACK Extender Transport Header (AETH) of ACK and is notified to the requester 30. A send sequence number (SSN) corresponding to the MSN in one-to-one correspondence is set in the WQE of the requester 30. The requester 30 releases the WQE of the SSN up to the value described in the MSN at the time of ACK reception. The SSN and the MSN are reset to SSN=1 and MSN=0 in the connection establishment phase of the RDMA-CM. The responder 50 manages the state of the MSN from the header information of the received request. The MSN is a sequence number of a message unit, and the packet sequence number (PSN) is a sequence number of a packet unit.

FIG. 6 is a diagram illustrating an example of a configuration of the communication system including the intermediate devices 10A and 10B of the present embodiment. Similarly to the communication system illustrated in FIG. 2, the intermediate devices 10A and 10B are disposed between the requester 30 and the responder 50 for transferring data using the RDMA.

The intermediate device 10A includes the transfer unit 11, a generation unit 12, a tracing unit 16, and a Work Queue (WQ) table 17. The intermediate device 10A may include the snooping unit 14 and the QPN table 15 illustrated in FIG. 2.

The transfer unit 11 transfers a request from the requester 30 to the responder 50, and transfers a response from the responder 50 to the requester 30.

The generation unit 12 picks up a request transmitted from the requester 30 and having a flag of Only or Last at the time of data transfer, generates a pseudo-Response to the request, and returns the generated pseudo-Response to the requester 30. When generating the pseudo-Response, the generation unit 12 uses the same PSN value as the request of Only or Last. Further, the generation unit 12 refers to the WQ table 17 to be described later to determine destination QPN and MSN to be included in the pseudo-Response.

When receiving the pseudo-Response, the requester 30 recognizes the response from the responder 50 and releases the WQE of the SSN up to the value described in the MSN of the pseudo-Response.

The tracing unit 16 registers a WQ entry having the QPN and MSN of the requester 30 in the WQ table 17, which will be described later, using the QPN of the responder 50 as a key at the time of establishing the connection. At this time, the tracing unit 16 resets the MSN of the WQ entry to 0.

The tracing unit 16 may generate the WQ entry and register the WQ entry in the WQ table 17 with the generation of the QPN entry in the QPN table 15 as a trigger. At this time, the WQ entry having the Local QPN and the MSN is created using the Remote QPN of the QPN entry as a key.

The tracing unit 16 identifies a message unit based on header information of a request received from the requester 30, and transitions the value of the MSN. Specifically, when receiving a request with a flag of Only or Last, the tracing unit 16 transitions the value of the MSN of the corresponding the WQ entry to simulate the state of the MSN of the responder 50.

The tracing unit 16 may delete the WQ entry of the WQ table 17 after the connection is released. For example, when the snooping unit 14 of FIG. 2 deletes the QPN entry, the tracing unit 16 deletes the WQ entry using the QPN corresponding to the QPN entry to be deleted as a key.

The WQ table 17 manages the QPN (src QPN) and the MSN of the requester 30 using the QPN (dst QPN) of the responder 50 as a key. FIG. 7 illustrates an example of the WQ table 17. In the WQ table 17, the WQ entry having the QPN and the MSN of the requester 30 transmitting a request is registered with the QPN of the responder 50 receiving the request as a key.

When generating the pseudo-Response to the request, the generation unit 12 retrieves the WQ entry having a key matching the QPN of the destination of the request and generates the pseudo-Response having the MSN value of the WQ entry. The src QPN of the WQ entry is set in the destination QPN of the pseudo-Response.

The intermediate device 10B includes the transfer unit 11 and a discard unit 13.

Similar to the transfer unit 11 of the intermediate device 10A, the transfer unit 11 transfers the request from the requester 30 to the responder 50 and transfers the response from the responder 50 to the requester 30.

The discard unit 13 discards a true response from the responder 50 to a request from the requester 30 at the time of data transfer. Thus, the duplicate reception of the response in the requester 30 can be prevented. The discard unit 13 may discard a message which may cause malfunction of the requester 30 among messages returned from the responder 50 to the requester 30.

The intermediate device 10A includes the discard unit 13 and the intermediate device 10B is not required to be disposed.

Figure 8:
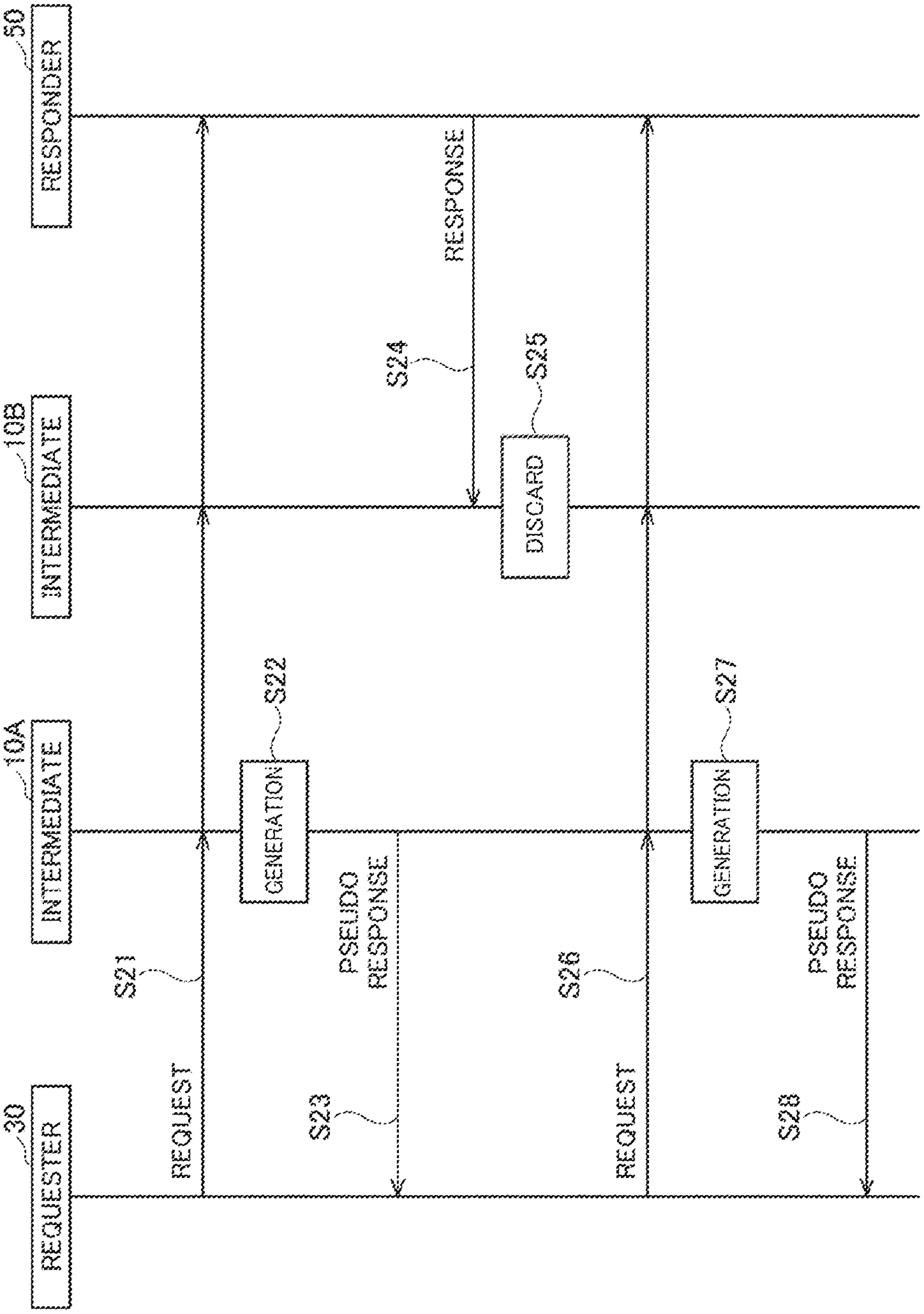
FIG. 8 is a sequence diagram illustrating an example of a flow of processing at the time of data transfer.

Next, an example of a flow of processing at the time of data transfer will be described with reference to the sequence diagram of FIG. 8.

In Step S21, the requester 30 loads the WQE into the SQ and transmits a request to the responder 50. The request includes data to be transferred. The request is transferred to the responder 50 via the intermediate devices 10A and 10B.

In Step S22, the intermediate device 10A refers to the WQ table 17 to determine the destination QPN and generates the pseudo-Response to the request.

In Step S23, the intermediate device 10A returns the pseudo-Response to the requester 30. When receiving the pseudo-Response, the requester 30 releases the WQE in the SQ.

After that, when the requester 30 loads the WQE into the SQ and transmits a request to the responder 50 (Step S26), when the request is transferred, the intermediate device 10A generates the pseudo-Response and returns the pseudo-Response to the requester 30 (Steps S27 and S28).

On the other hand, when the reception of the request is successful, the responder 50 transmits a response to the requester 30 in Step S24.

In Step S25, the intermediate device 10B discards the received response.

After that, the responder 50 returns a response when receiving the request and the intermediate device 10B discards the response.

Figure 9:
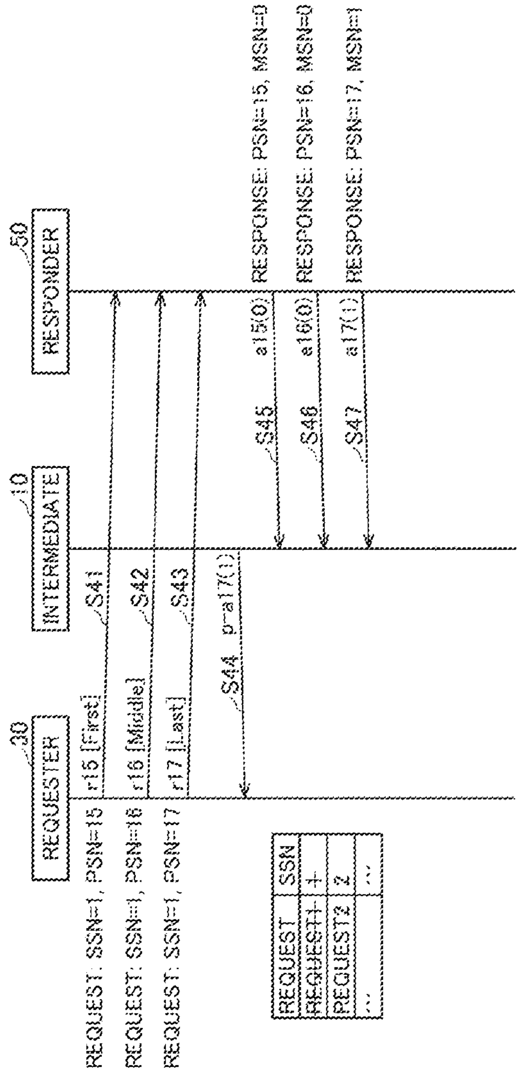
FIG. 9 is a sequence diagram illustrating an example of a flow of processing at the time of data transfer.

Next, an example of a flow of processing at the time of data transfer will be described with reference to the sequence diagram of FIG. 9. Here, the processing will be described in view of the management of the MSN. In FIG. 9, the intermediate devices 10A and 10B are illustrated as the intermediate device 10.

In Step S41 to Step S43, the requester 30 transmits a request for data transfer to the responder 50. It is assumed that any request is a request related to WQE associated with SSN=1. In the figure, r represents a request, and the number following r represents PSN. The request of r17 is a request in which a Last flag is set. The intermediate device 10 transfers the request to the responder 50, and the responder 50 receives the request.

When receiving the request of r17 in which the Last flag is set, the intermediate device 10 causes the value of the MSN of the corresponding WQ entry to transit in Step S44, generates the pseudo-Response having the value of the MSN after the transition, and transmits the pseudo-Response to the requester 30. In the figure, p-a represents a pseudo-Response, and the number following p-a represents PSN. Numbers in parentheses represent MSN. In the example illustrated in FIG. 9, the intermediate device 10 transfers the value of the MSN of the WQ entry from 0 to 1 to generate the pseudo-Response with PSN=17 and MSN=1, and transmits the pseudo-Response to the requester 30.

When receiving the pseudo-Response, the requester 30 releases the WQE having the SSN up to the value of the MSN of the pseudo-Response. In the example illustrated in FIG. 9, since the MSN of the pseudo-Response is 1, the requester 30 releases the WQE having the SSN of 1 or less.

On the other hand, when the reception of the request is successful, the responder 50 transmits a response to the requester 30 in Steps S45 to S47. In the figure, a represents a response, and a number following a represents PSN. Numbers in parentheses represent MSN. Responses to requests of r15 and r16 are a15 and a16, and both with MSN=0. The response to the request from r17 is a17 and MSN=1.

The intermediate device 10 discards the received response from the responder 50 without transferring the received response to the requester 30.

As described above, the intermediate device 10A of the present embodiment is the intermediate device 10A disposed between the requester 30 and the responder 50 for transferring data using the RDMA. The intermediate device 10A extracts a combination of the QPN of the requester 30 and the QPN of the responder 50 from a packet transmitted and received when establishing a connection between the requester 30 and the responder 50, and registers the combination in the QPN table 15. Thus, the intermediate device 10A can specify the return destination of the pseudo-Response at the time of establishing the connection.

The intermediate device 10A of the present embodiment manages the MSN representing a completion state of the request in the responder 50 in the WQ table 17, registers the QPN of the requester 30 and the MSN initialized to 0 in the WQ table 17 using the QPN of the responder 50 as a key at the time of establishing the connection, when a request with a flag of Last or Only is received from the requester 30, transitions the MSN number, generates a pseudo-Response to the request from the MSN after transition from the QP of the requester 30 and returns the pseudo-Response to the requester 30. Since the requester 30 releases the WQE of the SQ according to the pseudo-Response from the intermediate device 10A, even in a case where the RTT between the requester 30 and the responder 50 is large, the requester 30 can realize high-bandwidth data transfer without waiting for the response from the responder 50. Thus, it is possible to realize a long-distance high-speed operation of PUSH type data transfer from the requester 30 to the responder 50, particularly, data transfer of RDMA Write.

Figure 10:
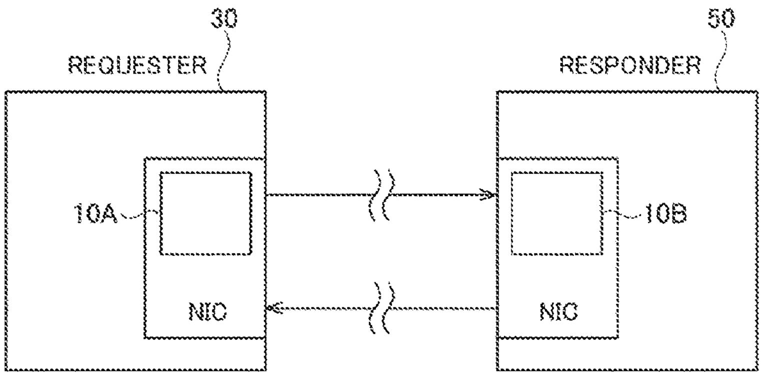
FIG. 10 is a diagram illustrating an example in which an intermediate device is configured on an NIC.

Although the above description has been made with the configuration in which the intermediate devices 10A and 10B are installed between the requester 30 and the responder 50, the intermediate device 10A may be configured on the network interface card (NIC) of the device of the requester 30, and the intermediate device 10B may be configured on the NIC of the device of the responder 50, as illustrated in FIG. 10. The intermediate devices 10A and 10B may be configured of a physical server or a virtual server. A network device such as a switch or a router may have the function of the intermediate devices 10A and 10B.

Figure 11:
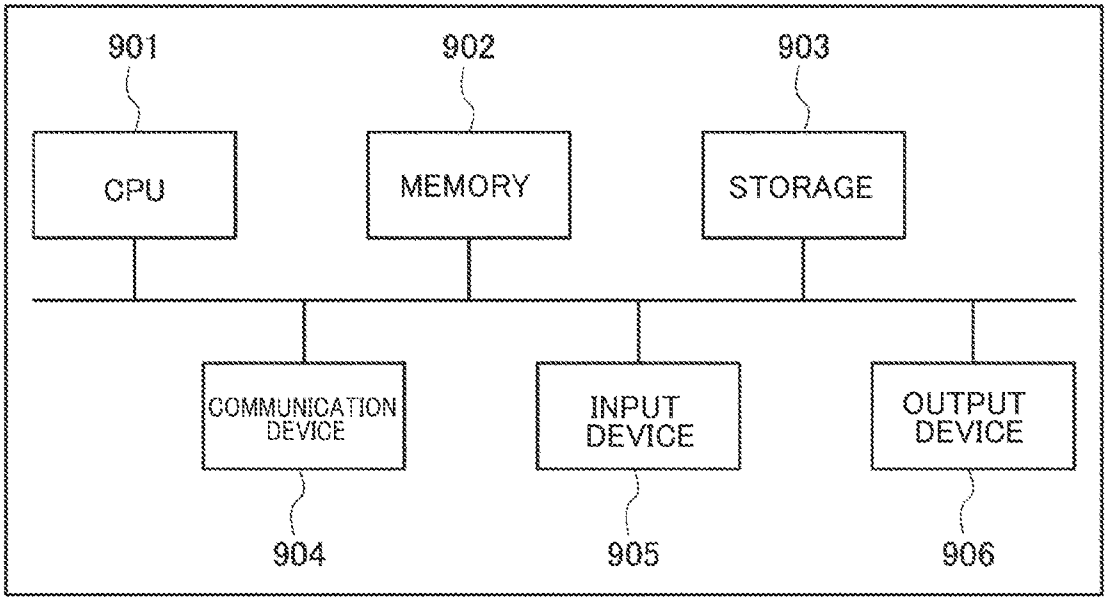
FIG. 11 is a diagram illustrating an example of a hardware configuration of the intermediate device.

As the intermediate devices 10A and 10B described above, it is possible to use a general-purpose computer system that includes a central processing unit (CPU) 901, a memory 902, a storage 903, a communication device 904, an input device 905, and an output device 906 as shown in, for example, FIG. 11. In the computer system, the intermediate devices 10A and 10B are implemented as the CPU 901 executes a prescribed program loaded on the memory 902. This program can be recorded on a computer-readable recording medium such as a magnetic disk, an optical disc, or a semiconductor memory, or can be distributed via a network.

REFERENCE SIGNS LIST

10, 10A, 10B Intermediate device
11 Transfer unit
12 Generation unit
13 Discard unit
14 Snooping unit
15 QPN table
16 Tracing unit
17 WQ table
30 Requester
50 Responder

The invention claimed is:

1. An intermediate device disposed between a first device and a second device for transferring data using remote direct memory access, the device comprising one or more processors configured to:

transfer a packet between the first device and the second device;

extract, from a packet exchanged during a connection establishment procedure between the first device and the second device, a combination of destination information of the first device and destination information of the second device;

register the extracted combination in a destination table for subsequent use in simulating a completion state of a transfer of a request;

manage a message sequence number of requests completed by the second device for each connection among a plurality of connections, in a management table located in the intermediate device;

register destination information of the first device;

initialize the message sequence number to zero in the management table using the destination information of the second device as a key in response to establishment of a connection;

increment the message sequence number in the management table in response to receiving, from the first device, the packet having a flag set to Last or Only, the flag indicating a last packet in a sequence of the request or a single packet of the request;

acquire destination information of the first device and the incremented message sequence number in the management table;

generate a pseudo-response to the request based on the incremented message sequence number; and transmit the pseudo-response to the first device.

2. The intermediate device according to claim 1, wherein one or more processors are configured to:

specify the combination of the destination information of the first device and the destination information of the second device based on a connection identifier for each of the first device and the second device to identify the connection; and register the combination in the destination table with the connection identifier as a key.

3. A communication method of an intermediate device disposed between a first device and a second device that transfer data using remote direct memory access, the method comprising:

transferring, by the intermediate device, a packet between the first device and the second device;

extracting, by the intermediate device and from a packet exchanged during a connection establishment procedure between the first device and the second device, a combination of destination information of the first device and destination information of the second device;

registering, by the intermediate device, the extracted combination in a destination table for subsequent use in simulating a completion state of a transfer of a request;

managing, by the intermediate device, a message sequence number of requests completed by the second device for each connection among a plurality of connections, in a management table located in the intermediate device;

registering, by the intermediate device, destination information of the first device;

initializing the message sequence number to zero in the management table using the destination information of the second device as a key in response to establishment of a connection;

incrementing, by the intermediate device, the message sequence number in the management table in response to receiving, from the first device, the packet having a flag set to Last or Only, the flag indicating a last packet in a sequence of the request or a single packet of the request;

acquiring, by the intermediate device, destination information of the first device and the incremented message sequence number in the management table;

generating, by the intermediate device, a pseudo-response to the request based on the incremented message sequence number; and transmitting, by the intermediate device, the pseudo-response to the first device.

4. One or more non-transitory computer-readable media storing software comprising instructions that are operable, when executed by one or more computers, to cause the one or more computers to perform operations comprising:

transferring, by an intermediate device, a packet between a first device and a second device;

extracting, by the intermediate device and from a packet exchanged during a connection establishment procedure between the first device and the second device, a combination of destination information of the first device and destination information of the second device;

registering, by the intermediate device, the extracted combination in a destination table for subsequent use in simulating a completion state of a transfer of a request;

managing, by the intermediate device, a message sequence number of requests completed by the second device for each connection among a plurality of connections, in a management table located in the intermediate device;

registering, by the intermediate device, destination information of the first device;

initializing the message sequence number to zero in the management table using the destination information of the second device as a key in response to establishment of a connection;

incrementing, by the intermediate device, the message sequence number in the management table in response to receiving, from the first device, the packet having a flag set to Last or Only, the flag indicating a last packet in a sequence of the request or a single packet of the request;

acquiring, by the intermediate device, destination information of the first device and the incremented message sequence number in the management table;

generating, by the intermediate device, a pseudo-response to the request based on the incremented message sequence number; and transmitting, by the intermediate device, the pseudo-response to the first device.

* * * * *